US011119531B2

(12) United States Patent
Fuchs et al.

(10) Patent No.: US 11,119,531 B2
(45) Date of Patent: Sep. 14, 2021

(54) PARALLEL PSEUDO INFINITE MONOTONIC TIMELINE CLOCK

(71) Applicant: Oracle International Corporation, Redwood Shores, CA (US)

(72) Inventors: Daniel Jean-Michel Fuchs, Dublin (IE); Chris Hegarty, Dublin (IE); Pavel Rappo, Dun Laoghaire (IE)

(73) Assignee: Oracle International Corporation, Redwood Shores, CA (US)

( * ) Notice: Subject to any disclaimer, the term of this patent is extended or adjusted under 35 U.S.C. 154(b) by 124 days.

(21) Appl. No.: 16/705,754

(22) Filed: Dec. 6, 2019

(65) Prior Publication Data

US 2021/0173429 A1 Jun. 10, 2021

(51) Int. Cl.
*G06F 1/14* (2006.01)
*G06F 1/12* (2006.01)

(52) U.S. Cl.
CPC . *G06F 1/14* (2013.01); *G06F 1/12* (2013.01)

(58) Field of Classification Search
CPC ..................................... G06F 1/14; G06F 1/12
See application file for complete search history.

(56) References Cited

U.S. PATENT DOCUMENTS

| | | |
|---|---|---|
| 4,322,831 A | 3/1982 | Peterson |
| 9,348,321 B2 | 5/2016 | Dougan et al. |
| 9,756,153 B2 | 9/2017 | Dougan et al. |

| | | | |
|---|---|---|---|
| 2004/0123306 A1* | 6/2004 | Gazda | G06F 9/45537 719/328 |
| 2006/0149526 A1* | 7/2006 | Torossian | G06F 30/33 703/16 |
| 2007/0050528 A1* | 3/2007 | Lameter | G06F 13/24 710/260 |

(Continued)

FOREIGN PATENT DOCUMENTS

| | | |
|---|---|---|
| CN | 102710410 A | 10/2012 |
| WO | 2018/019342 A1 | 2/2018 |

OTHER PUBLICATIONS

Dfuchs, "OpenJDK / jdk9 / jdk9 / hotspot", changeset 7765:fca33371ff0b, 2015, available online at <http://hg.openjdk.java.net/jdk9/jdk9/hotspot/rev/fca33371ff0b>, 5 pages.

(Continued)

*Primary Examiner* — Phil K Nguyen
(74) *Attorney, Agent, or Firm* — Invoke

(57) ABSTRACT

Techniques are included for providing a parallel pseudo infinite timeline monotonic clock that may be used to determine time and durations. A system clock is used to obtain an original time instant that anchors the pseudo infinite timeline to be parallel to a timeline of the system clock. The monotonic clock obtains time ticks from a monotonic tick supplier. The monotonic time ticks are used to determine times and durations, rather than relying on time instants obtained from the system clock. The use of a sliding window anchored at various times allows the parallel timeline to be almost infinite in implementation, rather than wrapping once a maximum value is reached. In addition, the accuracy of computations of time and duration are impervious to changes to the system clock, due to the use of the monotonic time ticks instead of obtaining multiple time instants from the system clock.

27 Claims, 5 Drawing Sheets

(56) References Cited

U.S. PATENT DOCUMENTS

| | | | |
|---|---|---|---|
| 2009/0158075 A1 | 6/2009 | Biberstein et al. | |
| 2011/0137581 A1* | 6/2011 | Chung | G01F 15/061 |
| | | | 702/47 |
| 2012/0078665 A1* | 3/2012 | Johnson | G16H 30/20 |
| | | | 705/3 |
| 2013/0308921 A1* | 11/2013 | Budzinski | H04N 9/8205 |
| | | | 386/241 |
| 2013/0346764 A1* | 12/2013 | Gullbrand | H02M 1/44 |
| | | | 713/300 |
| 2014/0019793 A1 | 1/2014 | De et al. | |
| 2018/0158300 A1* | 6/2018 | Laska | H04N 7/188 |
| 2020/0151366 A1* | 5/2020 | Chen | G06F 21/725 |

OTHER PUBLICATIONS

Dfuchs, "OpenJDK / jdk9 / jdk9 / jdk", changeset 11354:d6a5cbeb8198, 2015, available online at <http://hg.openjdk.java.net/jdk9/jdk9/jdk/rev/d6a5cbeb8198> 11 pages.

Is there any consistent (monotonic) Clock implementation in Java?, available online at <https://stackoverflow.com/questions/34778744/is-there-any-consistent-monotonic-clock-implementation-in-java>, 4 pages.

JDK-8068730, "Increase the precision of the implementation of java.time.Clock.systemUTC", 2015, available online at <https://bugs.openjdk.java.net/browse/JDK-8068730>, 4 pages.

Russ Cox, "Proposal: Monotonic Elapsed Time Measurements in Go", Last updated: Jan. 26, 2017, 32 pages.

\* cited by examiner

PARALLEL PSEUDO INFINITE MONOTONIC TIMELINE CLOCK

TECHNICAL FIELD

The present disclosure relates to computer system clocks. In particular, the present disclosure relates to measuring elapsed time using a parallel pseudo infinite monotonic timeline clock.

BACKGROUND

Computers may expose several different notions of time. A computer usually will expose the equivalent of a "wall clock," sometimes referred to as a system clock, that is configured to return the current time and/or date. The current time may be exposed as a number of seconds since the epoch (Jan. 1, 1970 00:00) plus an adjustment whose granularity depends on a particular operating system (OS) of the computer.

However, system clocks are not always accurate when used for functions other than reporting the current date and/or time, such as measuring elapsed time, defining timeouts, or scheduling events that are to transpire after a specific delay has occurred.

The computer may also expose monotonic tickers, which are basically frequency counters or aggregates in the form of seconds plus an adjustment as described above. However, the origin-in-time of these monotonic tickers is unspecified and/or system dependent, and bears no relationship with time elapsed since the epoch or to the wall clock.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
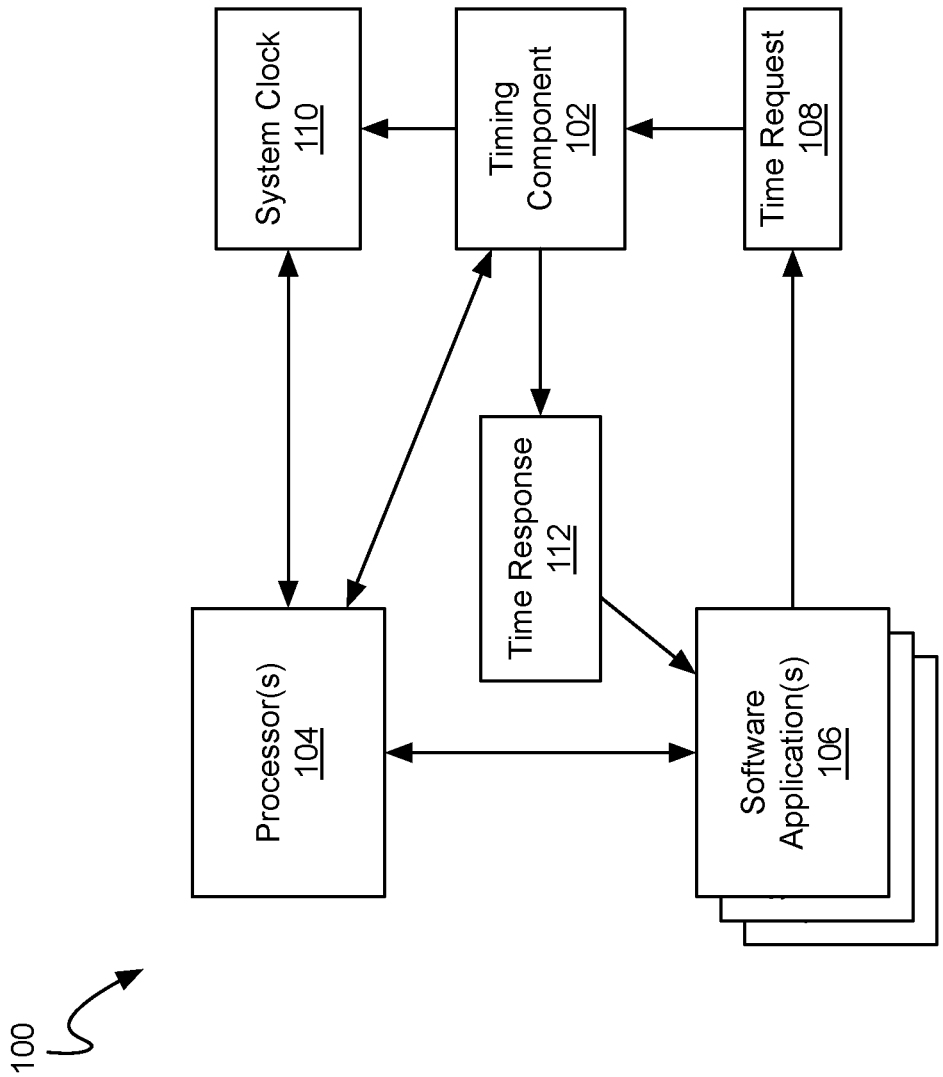
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. PARALLEL PSEUDO INIFINTE MONOTONIC TIMELINE CLOCK
   3.1 PSEUDO INFINITE TIME INSTANTS
   3.2 EASIER TIMEOUT CODING
   3.3 ORIGINAL BIAS
   3.4 SLIDING WINDOW
   3.5 USING A MONOTONIC TIMELINE CLOCK
4. COMPUTER NETWORKS AND CLOUD NETWORKS
5. MISCELLANEOUS; EXTENSIONS
6. HARDWARE OVERVIEW

1. General Overview

One or more embodiments implement an anchor-based clock that may be used to determine time, timeouts, deadlines, and elapsed times. The anchor-based clock relies on an anchor point from which a duration of time may be measured. An anchor point is defined as (a) a particular time instant, and (b) a tick value from a monotonic tick supplier that corresponds to the particular time instant. A currently elapsed time may be computed based on tick values. The tick value of the anchor point is subtracted from a current tick value obtained from the monotonic tick supplier to determine a tick value difference. The tick value difference is multiplied by a unit of time represented by each tick to determine the currently elapsed time. A current time may be computed by adding the currently elapsed time, as determined by the tick value difference, to the time instant of the anchor point.

A new anchor point may be defined for the anchor-based clock in response to a triggering event. The triggering event may include a periodic call executed for the purpose of selecting a new anchor point for the clock. The triggering event may include any use of the clock, such as an application measuring elapsed time. The triggering event for selecting the new anchor point may be a user-defined event.

A "window" of possible time values that may be determined by the clock may range from (a) the time instant defined by the anchor point, to (b) the time instant plus a time period corresponding to a maximum tick difference that may be computed by subtraction of tick values. The monotonic tick supplier may use a format for each tick value that allows for a large range of tick values before the tick values reported by the tick supplier wrap back around due to a maximum value being reached by the format. In an example, a tick value is represented by 64 bits (using the Java primitive long). In this example, the tick value can range from −9223372036854775808 to 9223372036854775807. Once the maximum tick value of 9223372036854775807 is reached, the tick value wraps around to −9223372036854775808 and continues to increase monotonically.

Since the window is based on the anchor point for the anchor-based clock, defining a new anchor point for the clock results in changing the window of possible time values that may be determined by the clock. Due to the changing nature of the window, the window may be referred to herein as a sliding window. In at least one embodiment, the triggering event(s) for selecting a new anchor point for the clock may be configured such that the triggering event is guaranteed to occur within the window defined as a function of the current anchor point.

An anchor-based clock, as described above, does not rely on periodic synchronization with any other external clock, such as a system clock (also referred to as a wall clock in a computer system). Accordingly, even if the anchor-based clock is initially configured using the system clock, the anchor-based clock is immune to any later forward or backward adjustment or correction to the system clock.

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a timing routine 102 and one or more processors 104 configured to execute at least one software application 106. The timing component 102 may utilize any of combination of software and/or hardware, such as an application programming interface (API), a program module, a field programmable gate array (FPGA), an application specific integrated circuit (ASIC), etc. The software application(s) 106 may access the timing component 102 to determine an aspect of time associated with the software application that called the timing component 102, such as current time, elapsed time, a desired timeout duration, etc. To utilize the timing component 102, a software application 106 may send a time request 108 to access the timing component 102, which may reference the system clock 110 to determine a response to the time request 108, and respond to the software application 106 with a time response 112, at an appropriate time, that includes information relevant to the time request 108, such as indication of a time duration having elapsed, an amount of time elapsed since start of a timer, a current time, etc. The timing component 102 is configured to provide time-based decisions and determinations with nanosecond granularity that are immune to changes to the time on the system clock 110.

For example, if the time request 108 asks for determination of an elapsed time, it may include a start time and rely on the timing component 102 to provide elapsed time updates periodically, depending on the granularity desired (nanoseconds, milliseconds, seconds, etc.).

In another example, if the time request 108 asks for determination of when a timeout will expire, it may include a timeout start time and a desired duration. Then, the timing component 102 may send the time response 112 upon expiration of the desired duration as determined from the timeout start time.

The components illustrated in FIG. 1 may be local to or remote from each other. The components illustrated in FIG. 1 may be implemented in software and/or hardware. Each component may be distributed over multiple applications, devices, and/or machines. Multiple components may be combined into one application, device, and/or machine. Operations described with respect to one component may instead be performed by another component or shared across multiple components.

Additional embodiments and/or examples relating to computer networks which may be used to communicate between various components of FIG. 1 are described below in Section 5. Computer Networks and Cloud Networks.

In one or more embodiments, a data repository may be included in the system 100 for storing various information. The data repository may include any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. Further, the data repository may be implemented or may execute on the same computing system as system 100. Alternatively or additionally, the data repository may be implemented or executed on a computing system separate from system 100. The data repository may be communicatively coupled to system 100 via a direct connection, via a wireless connection, via a network, or some other connection that would be apparent to one of ordinary skill in the art.

In an embodiment, system 100 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant (PDA), a wireless receiver and/or transmitter, a base station, a communication management device, a router, a switch, a controller, an access point, and/or a client device. In an alternate embodiment, system 100 may be partially or completely implemented as a software component operating within a hardware environment. In various examples, system 100 may be a desktop computer, laptop computer, tablet computer, smartphone, server, client device, or some other hardware device.

In one or more embodiments, an interface may be implemented in hardware and/or software to facilitate communications for system 100. The interface may render user interface elements and receive input via the user interface elements. Examples of interfaces include a graphical user interface (GUI), a command line interface (CLI), a haptic interface, a voice command interface, etc. Examples of user interface elements include checkboxes, radio buttons, drop-down lists, list boxes, buttons, toggles, text fields, date and time selectors, command lines, sliders, pages, and forms.

In an embodiment, different components of an interface may be specified in different languages. The behavior of each user interface element may be specified in a dynamic programming language, such as JavaScript. The content of user interface elements may be specified in a markup language, such as hypertext markup language (HTML), eXtensible Markup Language (XML), XML User Interface Language (XUL), etc. Moreover, a layout of user interface elements may be specified in a style sheet language, such as Cascading Style Sheets (CSS). Alternatively, an interface may be specified in one or more other languages, such as Java, C, C++, etc.

3. Parallel Pseudo Inifinte Monotonic Timeline Clock

Many of the descriptions provide example routines taken from the Java programming language. However, the embodiments described herein are not limited to use with Java objects and classes, and may utilize any programming object, routine, module, or class that is capable of providing the relevant information.

Detailed examples are described below for purposes of clarity. Components and/or operations described below should be understood as one specific example which may not be applicable to certain embodiments. Accordingly, components and/or operations described below should not be construed as limiting the scope of any of the claims.

One issue with the use of system clocks may occur when defining timeouts or scheduling events that are to transpire after a given delay has transpired, instead of at a specific instant of time. The use of seconds and milliseconds may be too coarse for such event scheduling, so application programming interfaces (APIs) may define an entry point that accepts quantities that have nanosecond granularity. For example, to provide the current time in Java, an API may use java.time.Duration, or a tuple having a 64-bit long value and java.util.concurrent.TimeUnit.

Using Java as an example, partly due to its ability to run on a wide variety of systems, Java only exposes some common abstractions of time:

1) java.lang.System.currentTimeMillis( ) which exposes a number of milliseconds since the epoch (in a non-monotonic fashion);
2) java.time.Clock.systemClock( ) which acts as a wall clock in the UTC timeline (also non-monotonic);
3) java.lang.System.nanoTime( ) which is a monotonic ticker whose origin in time is unspecified, and which represents a number of nanoseconds elapsed since the unspecified origin as ticks.

The first and second abstractions are based on the same underlying notion of time, with the first abstraction sometimes using a little less resources, depending on the intended use and circumstances. The third abstraction is a 64-bit long value with nanoseconds for units, but its granularity is system dependent and not guaranteed to be at the nanosecond level.

One issue with using these abstractions is that none of them is sufficient for measuring elapsed time or durations, as the first two abstractions provide good foundation for constructing APIs but not measuring elapsed time, and the third abstraction is error prone in its usage in code.

Another issue with the use of system clocks may occur when measuring elapsed time. In this example, unexpected skew may arise in response to an actor (e.g., another process, a system administrator, etc.) changing the date and/or time on the system. This results in clock skew, e.g., shifting in time forwards or backwards, which also commonly happens due to corrective actions taken to counter "gradual clock drift." Gradual clock drift occurs when a system clock time deviates from true time. All computer systems, by their nature, are susceptible to gradual clock drift which is undesirable.

One example where clock drift is detrimental occurs when applications are distributed across multiple systems (client/host, micro-services, etc.). The application (or portion thereof) should work from the exact same time. If time deviations exist between portions of the application, such as due to the application being distributed across multiple systems, it may lead to incorrect or bad processing of messages, loss of data, bugs in code, etc. To counter this undesirable situation, various methods of correction have been devised by the industry. One of the most popular is Network Time Protocol (NTP), which is used to keep many client and host system clocks synchronized, as well to keep clocks between guest virtual machines (VMs) and host systems synchronized (to avoid clock drift on the guest VMs).

However, updates of the system clock may cause issues in application or system timeout logic. An example of NTP disrupting deadlines and timeouts in the Java Development Kit (JDK) arises with this issue: JDK-7148829. Even though using UTC instants can shield the system from seasonal time changes, e.g., Daylight Savings Time (DST), they do not prevent occasional failures due to system time corrections.

For example, if an operation is started at time t0, which is the UTC time noted by the system at the instant the operation is started, and the operation wakes up after two seconds at time t1, then the system would calculate the UTC time at the time of wake up (t1) differently than t0+2 s. One possible cause of this discrepancy is if the system clock has been set back, or set forward, by the system administrator. The application measuring the elapsed time as t1−t0 may therefore find a completely arbitrary value, even a negative value, which is clearly inaccurate.

Due to this situation, the operation may act unexpectedly, e.g., it may be aborted too early (if the system clock was set forward), it may be aborted too late (if the system clock was set backward to a prior value), it may crash or end, such as when the possibility of calculating t1<t0 is not accounted for in the programming of the operation.

To avoid this issue, programs and applications usually avoid code that relies on the system clock for timeout measurement. Instead, alternative clocks on the system which are offering simple nanosecond ticks are utilized, which are more likely to be monotonic, but bear no relationship with any notion of the system clock time.

An example of a monotonic tick supplier is Java's System::nanoTime( ). This method returns a 64-bit number of ticks, where 0 is an arbitrary point in time whose position in a global timeline of the method is unknown by any system calling the method. As such, ticks delivered by System::nanoTime cannot be used to obtain the current time, but are very well suited to measure elapsed time and durations of time, provided that the elapsed time that the application tries to measure is less than about 292 years. This is because, Long.MAX_VALUE=$2^{63}$−1 ns~292 years.

This limitation on the amount of measurable time is unnecessary and presents a number of other issues. For example, any timeout given as a simple long (a 64-bit quantity) without further qualification invites misinterpretation by the coding, as a programmer may assume that an API is accepting a number of milliseconds, when in reality the implementation expects a number of seconds, or nanoseconds, to be passed. This will cause massive calculation errors. In another example, APIs that accept a timeout in the form of a number and a TimeUnit (a tuple) to overcome the previous issue, need to convert that quantity to a number of nanoseconds, so that the value may be used to compare with an elapsed time as defined by the difference of two successive values returned by System::nanoTime( ).

In addition, the quantity should be validated, because given a TimeUnit in any other unit than nanoseconds may overflow the maximum number of nanoseconds that can be represented in a long ($2^{63}$−1 ns).

Also, because the origin (point 0) of the ticks returned by System::nanoTime( ) is unknown, the value returned may be negative, or close to the maximum value that a long can hold. In either of these cases, special care should be taken when computing whether a duration has elapsed or not.

One example of code that may fail unpredictably is shown below.

```
long start=System.nanoTime( );
long deadline=start+timeout; // assuming there was no error in
// converting timeout to nanoseconds!
long now;
while ((now=System.nanoTime( )<deadline) {
sleep((deadline−now)/1000_000); // may wake up before deadline;
}
```

This code may not function properly, because now could be >0, but deadline=start+timeout may be <0 due to overflow of the long value. Developers and coders are required to remember the proper idiom when coding their timeout logic, which itself is error prone. Even experienced reviewers might not always spot the flaw that would cause an overflow at the wrong time—and implicit conversions to int are a great source of them. One or more embodiments described herein avoid such issues.

3.1 Pseudo Infinite Time Instants

Time instants provided by one or more embodiments are pseudo-infinite, meaning that in implementation, they are nearly boundless. This characteristic is a result of the time instants used in duration and elapsed time calculations having a range in the order of magnitude about $10^{11}$ years about the epoch. For comparison, the estimated age of the universe is about $13.8 \times 10^9$ years, meaning that the provided time instants can span a greater range of years than the age of the universe, providing near limitless range.

Some timing APIs, such as java.time.Instant and java.time.Duration, offer high-level API points that make it possible to define timeouts in terms of one or more durations, rather than referencing time instants obtained from the system clock. These APIs also obtain deadlines by adding durations to other instants, without having to address overflow concerns. In addition, java.time.Instant and java.time.Duration will, given appropriate exceptions, fail if overflows occur, but will not wrap around the epoch and produce undesirable and/or inaccurate results.

3.2 Easier Timeout Coding

One or more embodiments provide easier timeout handling and coding, which is also easier to review by someone checking the code for errors and faults. Moreover, the methods described herein, in one or more embodiments, provide a more appropriate method for obtaining and using timeouts. This is at least partly due to the use of java.time.Instant and java.time.Duration to obtain time instances that are synchronized to a pseudo-infinite timeline that is not subjected to unpredictable behavior when the system clock is changed.

Example code that uses time instants provided by a monotonic tick supplier is shown below in one embodiment. In this example code, the current time instant is referred to by a MonotonicClock.now( ) method/class.

Instant start=MonotonickClock.now( );
Instant deadline=start.add(duration);
Instant now;
Duration maxsleep=Duration.ofMillis(5000);
while ((now=MonotonickClock.now( )).isBefore(deadline)) {
Duration remaining=Duration.between(now, deadline);
sleep(remaining.toMillis( ));
}

The example code shown above obtains time instants from the method/class MonotonicClock.now( ), with the actual monotonic time instants being provided by any monotonic tick supplier available to be called or acquired by the system. However, the time instants may instead be delivered by the system clock, such as by using the method/class Clock.systemUTC( ). However, if the system clock time instants are used, the example code would be subject to unpredictable behavior in the event of system time updates and system clock changes.

Also, the example code shown above may wake up before the deadline is achieved. This aspect is included in the example code to check whether the loop should be interrupted (due to some unforeseen event or change that makes continued use of the loop moot) or whether to continue sleeping until the deadline is reached.

3.3 Original Bias

One or more embodiments provide a working timeline that is anchored to a UTC timeline at one point in time (e.g., "anchor point"). This working timeline is guaranteed to evolve monotonically by obtaining time instants from a monotonic tick supplier, e.g., System::nanoTime( ) method/class, instead of relying on a non-monotonic time provider, such as the system clock, e.g., Clock.systemUTC( ) method/class.

In one or more embodiments, to anchor the time instants to a timeline, such as the UTC timeline, two measurements are taken. The first measurement takes a snapshot of or otherwise obtains a time value of a current tick delivered by the monotonic tick supplier. The second measurement takes a snapshot of a current time instant delivered by a time provider, such as the system clock or some other suitable and reliable time provider. However, these two actions are not able to be performed exactly simultaneously. Therefore, due to even a small difference in time between the time when the snapshot of the time value of the current tick is obtained and the time when the snapshot of the current time instant is obtained, an original bias will exist in any calculation based on these two obtained time instants. Because at least a few processor cycles will take place between the two measurements taking place, this original bias will exist in any implementation that relies on two tie measurements.

Original bias is not typically an issue when measuring an elapsed duration between two instants delivered by the same time provider (e.g., the system clock). However, original bias is an issue when comparing instants delivered by different time providers (e.g., the monotonic clock, the system clock, a parallel clock, etc.). Such comparisons may be useful for diagnostic purposes, gauging whether one of the clocks deviates significantly from the other clock, measuring timeouts, measuring elapsed time, etc.

Figure 2:
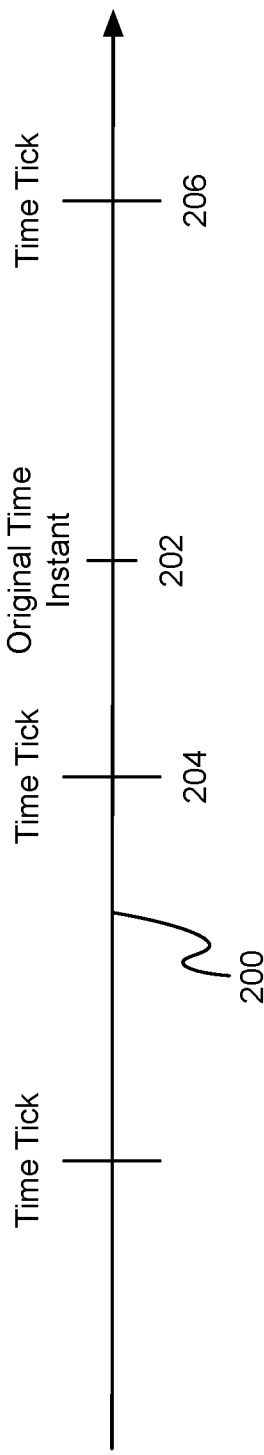
FIG. 2 shows an example timeline for original bias estimation.

One or more embodiments provide an estimation of the original bias. FIG. 2 shows an example timeline 200 for original bias estimation. The original bias estimation may be accomplished by framing the original time instant 202 obtained from a time provider (e.g., the system clock) as being positioned (temporally) between two time measurements obtained from the monotonic tick supplier, one time measurement (time tick 204) previous to the original time instant and one time measurement (time tick 206) subsequent to the original time instant. Based on the value of the two time ticks surrounding the original time instant, the original bias of the original time instant may be estimated as plus or minus (+/−) half of the difference between the previous and the subsequent time tick values, as shown in FIG. 2. The example pseudo-code shown below provides an original bias estimation in accordance with one embodiment.

long nanos0=ticks.getAsLong( );
Instant instant0=originalClock.instant( );
long nanos1=ticks.getAsLong( );
long nanos=nanos0+(nanos1−nanos0)/2L;
long bias=Math.abs((nanos1−nanos0)/2L);

Using this pseudo-code, the original bias (long bias) may be estimated as the absolute value of half the difference between the previous time tick (nanos0) and subsequent time tick (nanos1), e.g., (nanos1−nanos0), represented in long format. In this pseudo-code, the original time instant (instant0) corresponds to (nanos+/−bias).

It is not possible to actually know with any certainty at which point between nanos0 and nanos1 the original time instant was measured, but it is certain that it was not measured farther than +/−bias nanoseconds from a middle point between nanos0 and nanos1. Due to the discrete nature of the original clock, and of the monotonic tick supplier, this only provides an estimate of the original bias. Additionally, an estimated bias of zero does not indicate that there is no bias, but rather, that no estimation could be made due to an insufficient resolution of the monotonic tick supplier in one example.

3.4 Sliding Window

Because a variable stored using a long value can only accommodate +/−$2^{63}$ units of measurement (e.g., seconds, milliseconds, nanoseconds, etc.), the maximum observable delay by comparing two nanosecond tick values is one less than the maximum long value, e.g., $2^{63}$−1 ns=9,223,372, 036,854,775,807 ns. Although this may be sufficient for measuring some timeouts, it is an unnecessary limitation that the system clock does not have. The system clock measures time in terms of seconds from the epoch, with a nanosecond adjustment of less than one second. This limitation on the maximum amount of nanosecond delay may be overcome, in one or more embodiments, by maintaining a sliding window for the working timeline.

Figure 3:
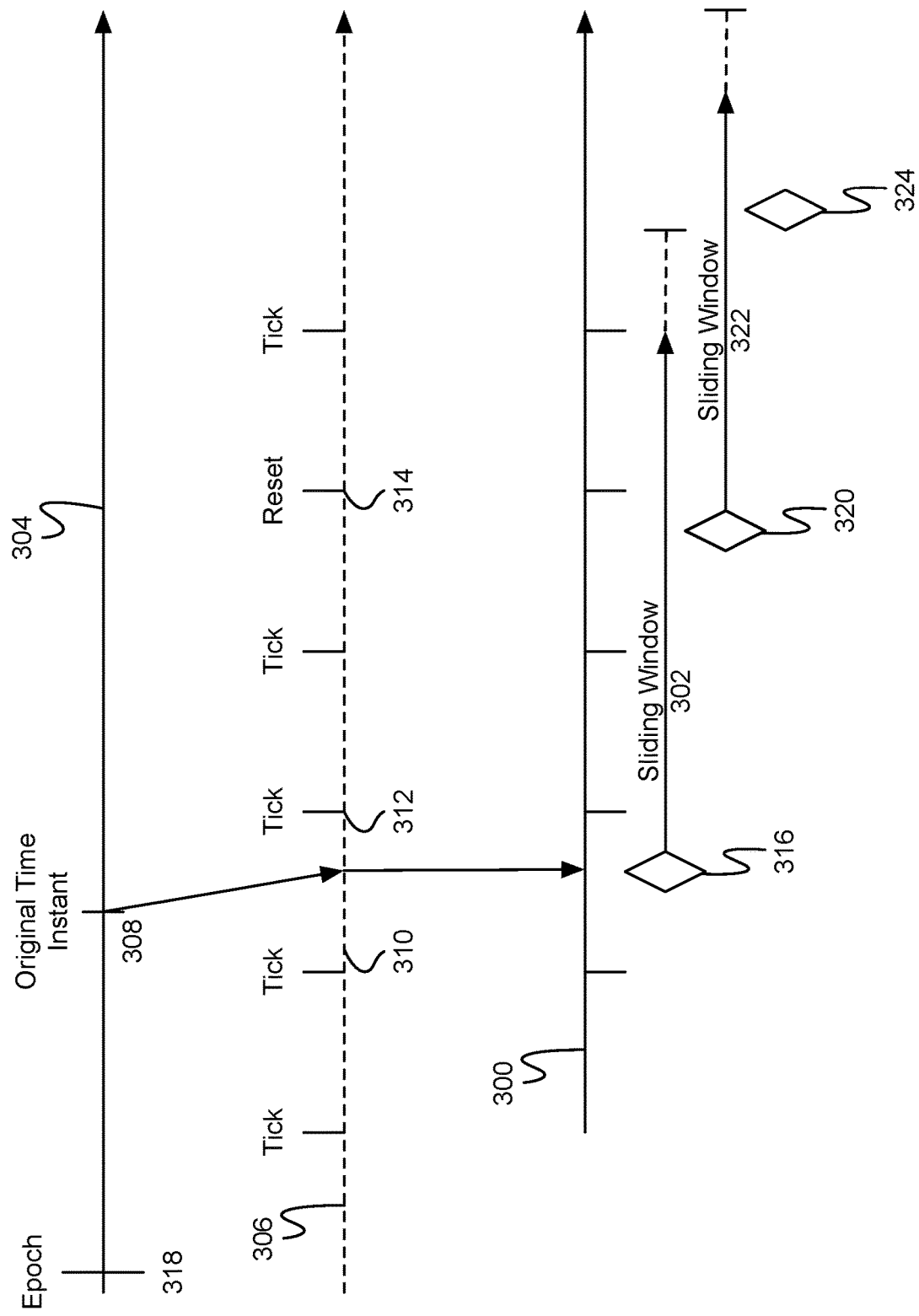
FIG. 3 shows an example monotonic timeline in one or more embodiments.

FIG. 3 shows an example monotonic timeline 300 in one or more embodiments. The monotonic clock maintains a sliding window 302 which is anchored to an original time instant 308 obtained from the system clock timeline 304 and one or more tick time stamps 310, 312 obtained from the monotonic tick supplier timeline 306.

When the monotonic clock is originally created, an initial sliding window 302 is generated that is set for a time interval that includes an anchor point 316 based on the original time instant 308 and an adjusted starting time tick. The adjusted starting time tick may be computed, in one embodiment, as the value of tick 310 that preceded the original time instant 308 added to the estimated original bias. The original bias may be calculated as the midpoint between tick 310 and tick 312. In one approach, the estimated original bias may be stored within a data structure for the sliding window 302 and/or in metadata associated with the sliding window 302.

Thereafter, when a time tick from the monotonic tick supplier is received that exceeds the current sliding window 302, a new sliding window is created. The decision to create a new sliding window may be based on determining a duration elapsed since the anchor point 316 is created for the sliding window 302, and when the duration is greater than an adjustable value (e.g., 6 hours, 12, hours, 24 hours, 48 hours, etc.), then a new anchor point 320 is computed for a new sliding window 322, where the new sliding window's anchor point 320 time instant is the previous sliding window's anchor point 316 time instant shifted by the elapsed duration. In addition, the new anchor point 320 may be established using the old anchor point's adjusted starting time tick shifted by the same elapsed duration. Once the system decides to create another new sliding window, while still within a time frame of sliding window 322, another new anchor point 324 may be established. The time instant of anchor point 324 for the next sliding window is calculated as the time instant of anchor point 320 for sliding window 322 shifted by the elapsed duration (e.g., the time duration for sliding window 322). This process is repeated for as long as the system is calculating time and durations using the monotonic timeline 300. In this way, the monotonic timeline 300 is pseudo infinite, as it can be extended indefinitely by using a series of sliding windows.

As long as the monotonic clock is used regularly and/or periodically (e.g., as long as its instant( ) method is called at least once every 292 years), then the instants delivered by the monotonic clock are guaranteed not to be skewed as a result of time ticks wrapping around the reset point 314 of the monotonic tick supplier timeline 306. For the next 2.9×$10^{11}$ years after the epoch, no wrapping will occur, unlike the System::nanoTime( ) method/class.

One embodiment of a monotonic clock binds a parallel clock that uses a monotonic tick supplier, e.g., System::nanoTime( ), to the system clock, e.g., Clock.systemClockUTC( ). This monotonic clock instance may be shared and used by all APIs and virtual machines (VMs) that want to use accurate durations with nanosecond resolution as a basis for implementing timeout logic.

An example where a monotonic clock may be used is the Java HTTP Client. The HTTP Client uses a dedicated thread (the selector manager thread) to listen to network events. The selector manager thread wakes up regularly and computes the next deadline at which timeouts or cache purges should occur, which ensures that the clock is used regularly. In such an application, no further action would be needed to guarantee that the clock instance is called often enough to avoid clock time error.

An application may also be configured to query the estimated original bias of the monotonic clock, and if it the original bias is determined to be higher than a desirable amount to ensure consistent resetting of the anchor points, the application might obtain a new instance of the monotonic clock, or cause a new sliding window to be created.

It is also noted that System::nanoTime( ) is not always monotonic. On some systems, a VM might not be able to obtain a monotonic time source. If the application is aware of a better monotonic tick supplier than what is known to the VM, then the application may provide the better source to the VM and create a new instance of the monotonic clock using the better source. The application, in one approach, may decide to construct a monotonic clock that enforces monotonicity—by using a constructor provided to this effect.

The self-healing sliding window keeps track of the previous time tick delivered by the monotonic tick supplier to ensure monotonicity even when the tick supplier is not necessarily monotonic. One embodiment modifies the use of the sliding window, by extending the condition upon which a new sliding window is created to a case where the routine detects that the tick supplier has reversed or started going backwards. In that case, knowing the last previous 'valid' ticks that were delivered by the tick supplier, a new sliding window may be created with the new time ticks as reference, and a new estimated bias may be created that is increased by the observed invalid time shift.

In one or more embodiments, a heuristic may be used to determine whether the underlying tick supplier is monotonic or not. This heuristic may be replaced by a call to native libraries, or even by a system property given on the command line. The heuristic, in one approach, may assume that if it observes a better resolution in the tick supplier than 100 nanoseconds, that a monotonic tick supplier is being used. This determination is based on knowing that System::nanoTime( ) will default to using the system clock if no better time source is available, and that the system clock resolution currently available on various supported systems is at best about 100 nanoseconds.

3.5 Using a Monotonic Timeline Clock

Figure 4:
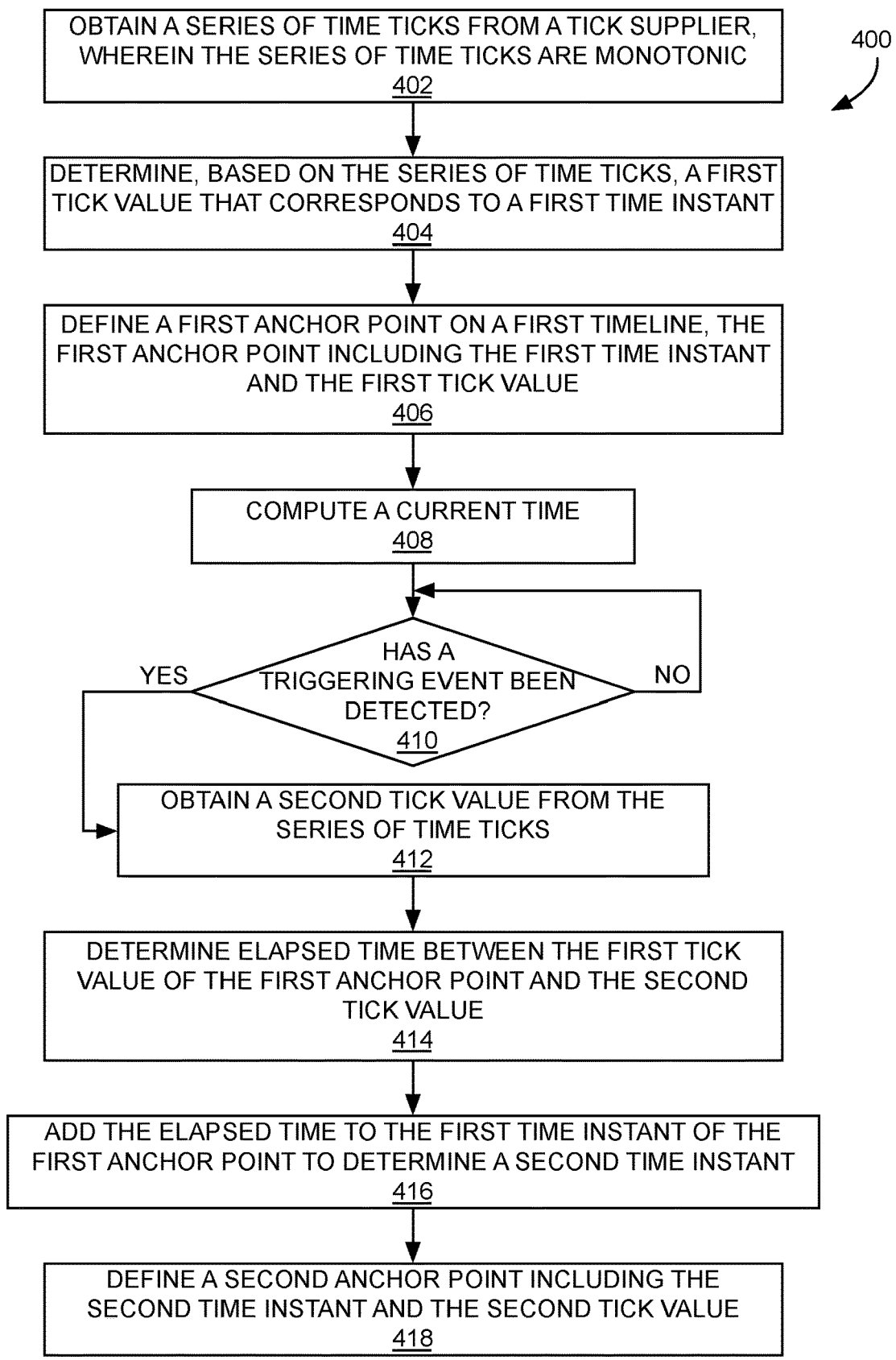
FIG. 4 illustrates an example method for using a monotonic timeline clock in accordance with one or more embodiments.

FIG. 4 illustrates an example method 400 for using a monotonic timeline clock in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments. The descriptions of method 400 utilize a system to perform the operations of method 400. The system may include at least one device having a hardware processor, such as a server, desktop computer, laptop computer, smartphone, PDA, etc.

The system receives or otherwise obtains a series of time ticks from a tick supplier (Operation 402). The series of time ticks are monotonic, meaning that the time ticks or instants continuously increase in value, and are not subject to jumps in time backwards or forwards. Any suitable monotonic tick supplier may be used. An example monotonic tick supplier that may be used is System::nanoTime( ); however, method 400 is not limited to obtaining monotonic ticks from System::nanoTime( ). In one approach, the series of time ticks may have nanosecond granularity or resolution. In other approaches, the series of time ticks may have a granularity that is finer than nanosecond granularity.

The system determines, based on the series of time ticks, a first tick value that corresponds to a first time instant (Operation 404). The first tick value, in one or more embodiments, may be the value of a next time tick received in the series of time ticks from the tick supplier. The next time tick is received immediately following a decision to set an anchor point, e.g., setting an initial anchor point to establish a first timeline, setting a new anchor point to establish a new sliding window along the first timeline, etc.

The first time instant may be referred to as an original or initial time instant. The first time instant is obtained from a reliable clock, such as a wall clock, system clock, or some other suitable time provider.

The system defines a first anchor point on a first timeline (Operation 406). The first anchor point includes the first time instant and the first tick value. In one embodiment, the first anchor point may be set relative to an epoch on the first timeline, with the epoch being an arbitrary or predefined value along the first timeline that may be used to determine where the first time instant falls on the first timeline. Due to this anchoring, the first timeline is parallel to a timeline of the clock used to obtain the first time instant.

Subsequent to defining the first anchor point, the system is capable of computing a current time (Operation 408). The system may compute the current time by obtaining a current tick value from the series of time ticks. The current tick value indicates a time tick from the series of time ticks that corresponds to the time instant when the current time is desired. Thereafter, the system determines a first amount of elapsed time between the first tick value of the first anchor point and the current tick value. The first amount of elapsed time may be determined in whatever units of time measurement that the series of ticks is reported in, e.g., for nanosecond time ticks, the elapsed time may be determined in nanoseconds. The system then adds the first amount of elapsed time to the first time instant of the first anchor point, accounting for measurement units, to determine the current time.

For example, if the first time instant is reported in hours:seconds:milliseconds, and the elapsed time is reported in nanoseconds, the system may convert the reported nanoseconds into a format of hours:seconds:milliseconds:nanoseconds, then add this time value to the hours:seconds:milliseconds of the first time instant to obtain the current time reported in hours:seconds:milliseconds:nanoseconds.

In one or more embodiments, the first time instant is delivered by and/or obtained from the system clock. In this embodiment, the first timeline is parallel to a timeline of the system clock based on the anchor point of the first timeline being based on the first time instant obtained from the system clock. Moreover, the use of a series of sliding windows, each having an anchor point established along the first timeline, may cause the first timeline to be pseudo infinite in implementation. Furthermore, accuracy of the current time is impervious to changes to the system clock.

The system then determines whether a triggering event has been detected (Operation 410). In one embodiment, the triggering event may include receiving a request for the current time. In this case, the current tick value is equal to the second tick value, and the first amount of elapsed time is equal to the second amount of elapsed time. In another embodiment, the triggering event may include a periodic event, with the periodic event being configured and/or designed to define a new anchor point on a periodic basis. In this case, the periodic event occurs at a certain frequency, with the frequency being selected to ensure that the series of tick values do not wrap around the rest point more than a desired amount, thus ensuring that the calculation for the elapsed time is accurate and not impacted by the inclusion of negative values for tick values.

If no triggering event has been detected, the system continues to wait for detection of such a triggering event. Responsive to detecting the triggering event, the system obtains a second tick value from the series of time ticks (Operation 412). The second tick value corresponds to a next time tick from the series of time ticks immediately after or coincident with detecting the triggering event.

The system determines a second amount of elapsed time between the first tick value of the first anchor point and the second tick value (Operation 414). The second amount of elapsed time may be determined in whatever units of time measurement that the series of ticks is reported in, e.g., for sub-nanosecond time ticks, the elapsed time may be determined in less than nanosecond granularity.

The second amount of elapsed time is added to the first time instant of the first anchor point by the system to determine a second time instant (Operation 416). This calculation takes into account the units of time measurement used for each of the values added together.

The system defines a second anchor point that includes the second time instant and the second tick value (Operation 418) after the second time instant is determined. This second anchor point defines a new sliding window along the first timeline, such that any wraparound time tick values received from the series of time ticks are able to be recognized and accounted for in calculating any requested time durations.

In one or more embodiments, the system may receive, obtain, request, or otherwise recognize a desired timeout duration. In one approach, this desired timeout duration may be received from another system, device, application, or routine. In other words, the system determines whether a requesting application, system, device, or other originating actor of a timeout request has indicated a certain duration to be determined.

In one or more embodiments, the system may receive a desired timeout duration from a first device. The desired timeout duration may be reported in any unit of time measurement (e.g., hours, seconds, milliseconds, nanoseconds, etc.) and/or based on a trigger alone or in conjunction with an offset amount of time. Some example triggers include, but are not limited to, completion of some process or task, start of some process or task, occurrence of some event, cessation of some action, etc. Based on the desired timeout duration, the system calculates an amount of elapsed time since a timeout start time.

In an example, the timeout duration may indicate a trigger as the start of an application on the system, along with a desired duration for the timeout as being an amount of time from now until two seconds after the application is started. This indicates that an offset of two seconds is included in the duration after the trigger is observed (e.g., duration=application start time+2 s−current time).

In another example, the timeout duration may indicate a duration of at least 30 s in conjunction with a trigger of a certain routine ending. In this example, the timeout duration will not be less than 30 s, but may extend longer in response to the routine not having ended before 30 s having elapsed. In the case where the certain routine is still running after 30 s, the timeout duration will extend until the certain routine ends.

In response to the system determining that a timeout duration has been established, the system calculates a third amount of elapsed time since a timeout start time. This calculation is based on the series of time ticks. In one approach, a particular tick value from the series of time ticks corresponding to the timeout start time is determined. The system uses this particular tick value, along with the series of time ticks subsequent to the particular tick value, to determine the third amount of elapsed time.

Thereafter, the system determines expiration of the desired timeout duration based on the third amount of elapsed time. In a further approach, the system may send indication of expiration of the desired timeout duration to the first device (or some other device designated to receive such notification) in response to expiration of the desired timeout duration, such as by sending an interrupt, notification, message, etc.

In this way, the first device may be able to send a request for the timeout, and receive a response when the timeout has occurred, without any further processing being required. For example, the first device may sleep and wake once the response is received.

In one approach, the system may receive the timeout start time from the first device, such as in the timeout request for the desired timeout duration, or in some other transmission. In an alternate approach, the timeout start time may be based on a trigger, as described above, a state of a device or application, or instruct the duration determination to begin immediately with receipt of the timeout request.

In one approach, the system may set the timeout start time at a time instant that the desired timeout duration is received from the first device (possibly adjusted to account for differences between reception time and a next received time tick from the tick supplier, as described previously).

In one or more embodiments, the system may, subsequent to defining the second anchor point, compute an updated current time. A similar technique to that described previously may be used to compute the updated current time (indicating a current time when a check is performed after the second anchor point, or any anchor point subsequent to the first anchor point, is defined). Using the second anchor point, the system obtains an updated current tick value from the series of time ticks, determines a third amount of elapsed time between the second tick value of the second anchor point and the updated current tick value, and adds the third amount of elapsed time to the second time instant of the second anchor point to determine the updated current time. This updated current time may then be reported to any device and/or used in additional computations that utilize a current time.

Accuracy of the determined current or elapsed time (and thus the instant that any timeout expires) is impervious to changes to the clock from which the current time instant is initially obtained (e.g., the system clock) as a basis for the first timeline. This is because the current and elapsed times are determined based on the series of monotonic time ticks instead of time ticks provided by the system clock, which may be interrupted and/or adjusted based on any changes made to the system clock after the first anchor point was set.

In one embodiment, the system may estimate an original bias. The original bias results from a difference in time between the first time instant obtained from the system clock and an actual time when an original time tick is received from the tick supplier after the first time instant. The original time tick occurs after the first anchor point is defined. When an original bias is calculated, the first tick value may be set to equal a value of the original time tick added to the original bias. The techniques described above may be used to estimate an original bias for use in adjusting the first tick value whenever an initial anchor point is set for a new parallel timeline based on a time instant obtained from a clock's timeline, in one or more embodiments.

4. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts" or "clients") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
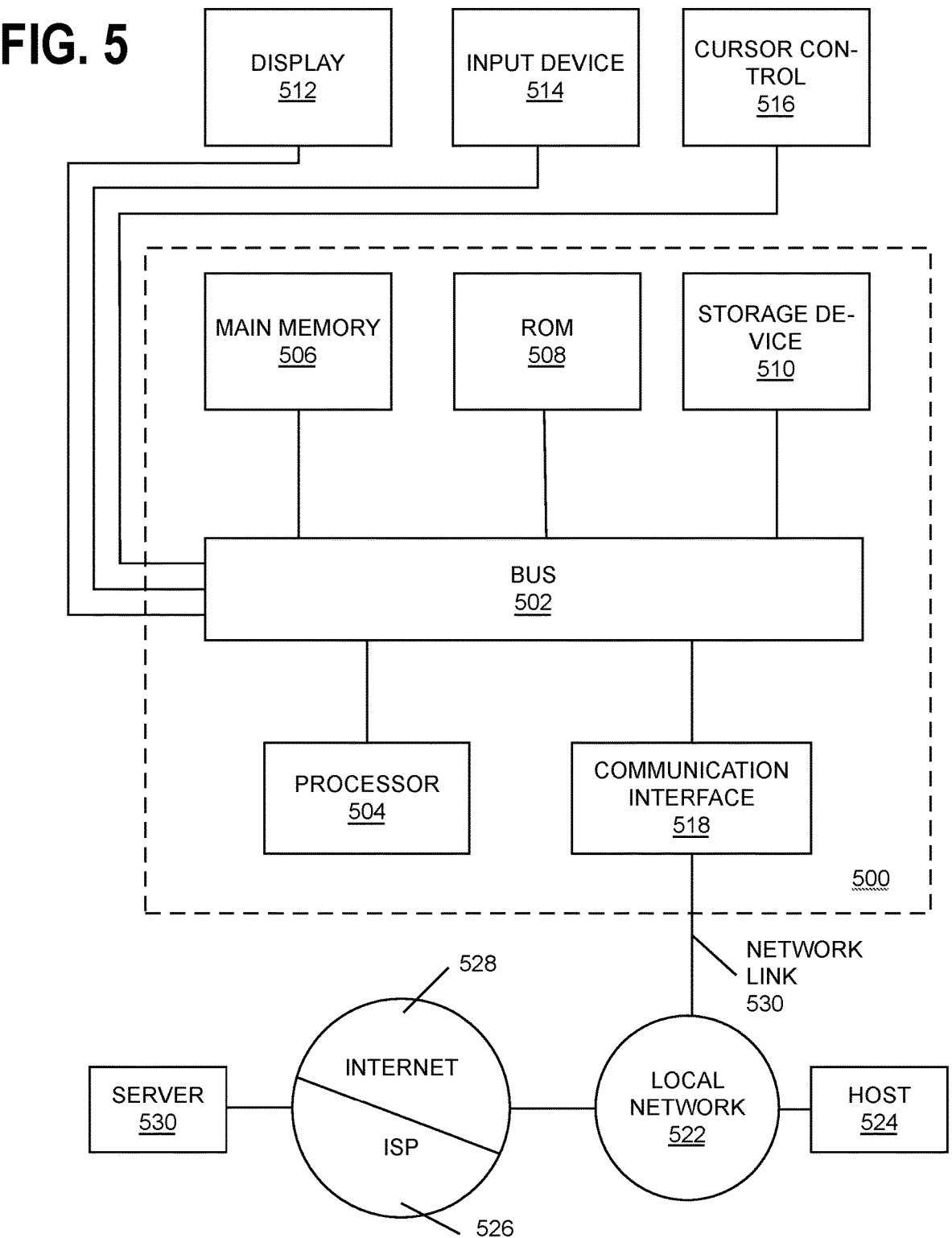
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    obtaining a series of time ticks from a tick supplier, wherein the series of time ticks is monotonic;
    determining, based on the series of time ticks, a first tick value that corresponds to a first time instant;
    defining a first anchor point on a first timeline, the first anchor point comprising the first time instant and the first tick value;
    subsequent to defining the first anchor point, computing a current time by:
        obtaining a current tick value from the series of time ticks;
        determining a first amount of elapsed time between the first tick value of the first anchor point and the current tick value; and
        adding the first amount of elapsed time to the first time instant of the first anchor point to determine the current time; and
    responsive to a triggering event:
        obtaining a second tick value from the series of time ticks;
        determining a second amount of elapsed time between the first tick value of the first anchor point and the second tick value;
        adding the second amount of elapsed time to the first time instant of the first anchor point to determine a second time instant; and
        defining a second anchor point comprising the second time instant and the second tick value.

2. The medium as recited in claim 1, wherein the operations further comprise:
    receiving a desired timeout duration from a first device;
    calculating a third amount of elapsed time since a timeout start time based on the series of time ticks;
    determining expiration of the desired timeout duration based on the third amount of elapsed time; and
    sending indication of expiration of the desired timeout duration to the first device in response to expiration of the desired timeout duration.

3. The medium as recited in claim 2, wherein the operations further comprise setting the timeout start time at a time instant when the desired timeout duration is received.

4. The medium as recited in claim 2, wherein the operations further comprise:
    receiving indication of the timeout start time from the first device; and
    determining a particular tick value from the series of time ticks corresponding to the timeout start time, and
    wherein the third amount of elapsed time is further based on the particular tick value.

5. The medium as recited in claim 1, wherein the first time instant is obtained from a system clock, wherein the first anchor point is defined relative to an epoch on the first timeline, wherein the first timeline is parallel to a second timeline of the system clock, and wherein accuracy of the current time is impervious to changes to the system clock.

6. The medium as recited in claim 1, wherein the operations further comprise:
    estimating an original bias resulting from a difference in time between the first time instant and an actual time when an original time tick is received from the tick supplier after the first time instant; and
    setting the first tick value to equal a value of the original time tick added to the original bias.

7. The medium as recited in claim 1, wherein the triggering event comprises receiving a request for the current time, wherein the current tick value is equal to the second tick value, and wherein the first amount of elapsed time is equal to the second amount of elapsed time.

8. The medium as recited in claim 1, wherein the triggering event comprises a periodic event configured to define a new anchor point, the periodic event occurring at a certain frequency.

9. The medium as recited in claim 1, wherein the operations further comprise:

subsequent to defining the second anchor point, computing an updated current time by:
   obtaining an updated current tick value from the series of time ticks;
   determining a third amount of elapsed time between the second tick value of the second anchor point and the updated current tick value; and
   adding the third amount of elapsed time to the second time instant of the second anchor point to determine the updated current time.

10. A system, comprising:
one or more hardware processors;
a non-transitory computer readable medium comprising instructions which, when executed by the one or more hardware processors, causes performance of operations comprising:
   obtaining a series of time ticks from a tick supplier, wherein the series of time ticks is monotonic;
   determining, based on the series of time ticks, a first tick value that corresponds to a first time instant;
   defining a first anchor point on a first timeline, the first anchor point comprising the first time instant and the first tick value;
   subsequent to defining the first anchor point, computing a current time by:
      obtaining a current tick value from the series of time ticks;
      determining a first amount of elapsed time between the first tick value of the first anchor point and the current tick value; and
      adding the first amount of elapsed time to the first time instant of the first anchor point to determine the current time; and
   responsive to a triggering event:
      obtaining a second tick value from the series of time ticks;
      determining a second amount of elapsed time between the first tick value of the first anchor point and the second tick value;
      adding the second amount of elapsed time to the first time instant of the first anchor point to determine a second time instant; and
      defining a second anchor point comprising the second time instant and the second tick value.

11. The system as recited in claim 10, wherein the operations further comprise:
receiving a desired timeout duration from a first device;
calculating a third amount of elapsed time since a timeout start time based on the series of time ticks;
determining expiration of the desired timeout duration based on the third amount of elapsed time; and
sending indication of expiration of the desired timeout duration to the first device in response to expiration of the desired timeout duration.

12. The system as recited in claim 11, wherein the operations further comprise setting the timeout start time at a time instant when the desired timeout duration is received.

13. The system as recited in claim 11, wherein the operations further comprise:
receiving indication of the timeout start time from the first device; and
determining a particular tick value from the series of time ticks corresponding to the timeout start time, and wherein the third amount of elapsed time is further based on the particular tick value.

14. The system as recited in claim 10, wherein the first time instant is obtained from a system clock, wherein the first anchor point is defined relative to an epoch on the first timeline, wherein the first timeline is parallel to a second timeline of the system clock, and wherein accuracy of the current time is impervious to changes to the system clock.

15. The system as recited in claim 10, wherein the operations further comprise:
estimating an original bias resulting from a difference in time between the first time instant and an actual time when an original time tick is received from the tick supplier after the first time instant; and
setting the first tick value to equal a value of the original time tick added to the original bias.

16. The system as recited in claim 10, wherein the triggering event comprises receiving a request for the current time, wherein the current tick value is equal to the second tick value, and wherein the first amount of elapsed time is equal to the second amount of elapsed time.

17. The system as recited in claim 10, wherein the triggering event comprises a periodic event configured to define a new anchor point, the periodic event occurring at a certain frequency.

18. The system as recited in claim 10, wherein the operations further comprise:
subsequent to defining the second anchor point, computing an updated current time by:
   obtaining an updated current tick value from the series of time ticks;
   determining a third amount of elapsed time between the second tick value of the second anchor point and the updated current tick value; and
   adding the third amount of elapsed time to the second time instant of the second anchor point to determine the updated current time.

19. A method, comprising:
obtaining a series of time ticks from a tick supplier, wherein the series of time ticks is monotonic;
determining, based on the series of time ticks, a first tick value that corresponds to a first time instant;
defining a first anchor point on a first timeline, the first anchor point comprising the first time instant and the first tick value;
subsequent to defining the first anchor point, computing a current time by:
   obtaining a current tick value from the series of time ticks;
   determining a first amount of elapsed time between the first tick value of the first anchor point and the current tick value; and
   adding the first amount of elapsed time to the first time instant of the first anchor point to determine the current time; and
responsive to a triggering event:
   obtaining a second tick value from the series of time ticks;
   determining a second amount of elapsed time between the first tick value of the first anchor point and the second tick value;
   adding the second amount of elapsed time to the first time instant of the first anchor point to determine a second time instant; and
   defining a second anchor point comprising the second time instant and the second tick value.

20. The method as recited in claim 19, further comprising:
receiving a desired timeout duration from a first device;
calculating a third amount of elapsed time since a timeout start time based on the series of time ticks;

determining expiration of the desired timeout duration based on the third amount of elapsed time; and sending indication of expiration of the desired timeout duration to the first device in response to expiration of the desired timeout duration.

21. The method as recited in claim 20, further comprising setting the timeout start time at a time instant when the desired timeout duration is received.

22. The method as recited in claim 20, further comprising:
receiving indication of the timeout start time from the first device; and
determining a particular tick value from the series of time ticks corresponding to the timeout start time,
wherein the third amount of elapsed time is further based on the particular tick value.

23. The method as recited in claim 20, wherein the first time instant is obtained from a system clock, wherein the first anchor point is defined relative to an epoch on the first timeline, wherein the first timeline is parallel to a second timeline of the system clock, and wherein accuracy of the current time is impervious to changes to the system clock.

24. The method as recited in claim 20, further comprising:
estimating an original bias resulting from a difference in time between the first time instant and an actual time when an original time tick is received from the tick supplier after the first time instant; and
setting the first tick value to equal a value of the original time tick added to the original bias.

25. The method as recited in claim 20, wherein the triggering event comprises receiving a request for the current time, wherein the current tick value is equal to the second tick value, and wherein the first amount of elapsed time is equal to the second amount of elapsed time.

26. The method as recited in claim 20, wherein the triggering event comprises a periodic event configured to define a new anchor point, the periodic event occurring at a certain frequency.

27. The method as recited in claim 20, further comprising:
subsequent to defining the second anchor point, computing an updated current time by:
obtaining an updated current tick value from the series of time ticks;
determining a third amount of elapsed time between the second tick value of the second anchor point and the updated current tick value; and
adding the third amount of elapsed time to the second time instant of the second anchor point to determine the updated current time.

* * * * *

UNITED STATES PATENT AND TRADEMARK OFFICE
CERTIFICATE OF CORRECTION

PATENT NO. : 11,119,531 B2
APPLICATION NO. : 16/705754
DATED : September 14, 2021
INVENTOR(S) : Fuchs et al.

It is certified that error appears in the above-identified patent and that said Letters Patent is hereby corrected as shown below:

In the Specification

In Column 2, Line 5, delete "INIFINTE" and insert -- INFINITE --, therefor.

In Column 4, Line 52, delete "Inifinte" and insert -- Infinite --, therefor.

In Column 5, Line 11, delete "java.lang.System.currentTimeMillis( )" and insert -- java.lang.System.currentTimeMillis( ), --, therefor.

In Column 5, Line 14, delete "java.time.Clock.systemClock( )" and insert -- java.time.Clock.systemClock( ), --, therefor.

In Column 5, Line 16, delete "java.lang.System.nanoTime( )" and insert -- java.lang.System.nanoTime( ), --, therefor.

In Column 6, Line 2, delete "t0+2 s." and insert -- t0+2s. --, therefor.

In Column 6, Line 60, delete "( )<deadline)" and insert -- ( ))<deadline) --, therefor.

In Column 7, Line 43, delete "MonotonickClock" and insert -- MonotonicClock --, therefor.

In Column 7, Line 47, delete "MonotonickClock" and insert -- MonotonicClock --, therefor.

Signed and Sealed this
Fifteenth Day of February, 2022

Drew Hirshfeld
*Performing the Functions and Duties of the*
*Under Secretary of Commerce for Intellectual Property and*
*Director of the United States Patent and Trademark Office*